United States Patent

Haka

[11] Patent Number: 5,803,858
[45] Date of Patent: Sep. 8, 1998

[54] POWERTRAIN TRANSMISSION WITH TORQUE CONVERTER PLANETARY GEARING AND A CONTINUOUSLY VARIABLE TRANSMISSION UNIT

[75] Inventor: Raymond James Haka, Brighton, Mich.

[73] Assignee: General Motors Corporation, Detroit, Mich.

[21] Appl. No.: 862,883

[22] Filed: May 23, 1997

[51] Int. Cl.$^6$ .................................................. F16H 37/02
[52] U.S. Cl. ............................ 475/210; 475/214; 475/207
[58] Field of Search .................................... 475/207, 210, 475/211, 214, 215, 218; 474/72, 73, 11

[56] References Cited

U.S. PATENT DOCUMENTS

| | | | |
|---|---|---|---|
| 4,550,629 | 11/1985 | Kawamoto | 475/210 |
| 4,644,821 | 2/1987 | Sumiyoshi et al. | 475/211 X |
| 4,740,191 | 4/1988 | Takano et al. | 474/11 X |
| 4,836,049 | 6/1989 | Moan | 475/211 X |
| 4,856,369 | 8/1989 | Stockton | 74/665 GE |
| 5,470,285 | 11/1995 | Schneider et al. | 475/210 |
| 5,669,846 | 9/1997 | Moroto et al. | 475/211 |
| 5,720,686 | 2/1998 | Yan et al. | 475/211 |

Primary Examiner—Charles A. Marmor
Assistant Examiner—Peter T. Kwon
Attorney, Agent, or Firm—Donald F. Scherer

[57] ABSTRACT

A power transmission has an engine driven torque converter and a selectively engageable direct clutch. The output from the torque converter is connected through a one-way clutch to a planetary gearing input, the output of which is connected to a transmission output. The selectively engageable direct clutch connects the input of a continuously variable transmission with the engine in bypassing relationship with the torque converter. The continuously variable transmission output is connected with the transmission output in parallel relationship with the planetary gearing. Engagement of the direct clutch transfers the engine input from the planetary gearing to the continuously variable transmission.

2 Claims, 1 Drawing Sheet

5,803,858

POWERTRAIN TRANSMISSION WITH TORQUE CONVERTER PLANETARY GEARING AND A CONTINUOUSLY VARIABLE TRANSMISSION UNIT

TECHNICAL FIELD

This invention relates to powertrains have a continuously variable transmission range of operation.

BACKGROUND OF THE INVENTION

The use of continuously variable units (CVU) is becoming increasingly popular in small motor vehicles. The CVU generally has a pair of spaced sheave assemblies with a flexible member, such as a rubber, fabric or steel belt, entrained on the sheaves for transmitting drive force from the input to the output. The sheave assemblies each have an axially movable half which permits a variation of the sheave diameter at which the flexible member contacts the sheave. This permits a change in speed ratio between the CVU input and output. Since the diameters can be varied by minute amounts, the drives have been termed continuously variable.

CVUs have been popular in small offroad vehicles, such as golf carts, snow mobiles and garden tractors. These vehicles have low torque engines which do not overstress the rubber or fabric flexible member, thus permitting the use of rubber or fabric belts. These flexible members transmit torque between the sheaves on the tension side of the member.

More recently, steel belts have become commercially feasible and permit higher torque levels to be transmitted. These belts have higher torque capacity than the flexible belt. However, these devices also have torque capacity limitations. The torque capacity limitation is dependent upon the frictional characteristics of the belt and pulleys or sheaves, as well as structural features. The steel belts transmit torque on the compression side and can be cooled and lubricated with a liquid medium.

SUMMARY OF THE INVENTION

It is an object of the present invention to provide an improved powertrain having a CVU path and a gearing, wherein the gearing path is used during high torque requirements and the CVU path is used during low torque requirements.

In one aspect of the invention, a torque converter and planetary gearing arrangement provide a power path during a low forward range and a reverse range while a CVU provides a power path during a high forward range. This permits a higher torque output with a given torque input. The higher torque outputs are due to the torque multiplication of the torque converter.

During high torque requirements, for example, at vehicle launch, the CVU is bypassed and the larger torque loads are transmitted to the torque converter in the planetary gearing. This will allow the use of CVU powertrains in larger vehicles where higher torque levels are required for initial acceleration due to the increased inertia inherent in these larger vehicles. The increased torque capacity will also improve the gradeability of all vehicles.

In another aspect of the invention, a planetary gearset is connected to be driven through a one-way clutch by a torque converter. The output of the planetary gearing is connected to a transmission output member. A CVU is selectively driven by the engine through a friction clutch. Input drives to the planetary gearset in the CVU are sized such that a substantially synchronous upshift or ratio change is made from the planetary ratio to the continuously variable transmission ratio as the torque converter approaches a speed ratio of one.

The torque converter in the planetary power path assists in establishing the synchronous upshift due to the slip condition associated with fluid drive mechanisms.

DESCRIPTION OF EXEMPLARY EMBODIMENTS

Figure 1:
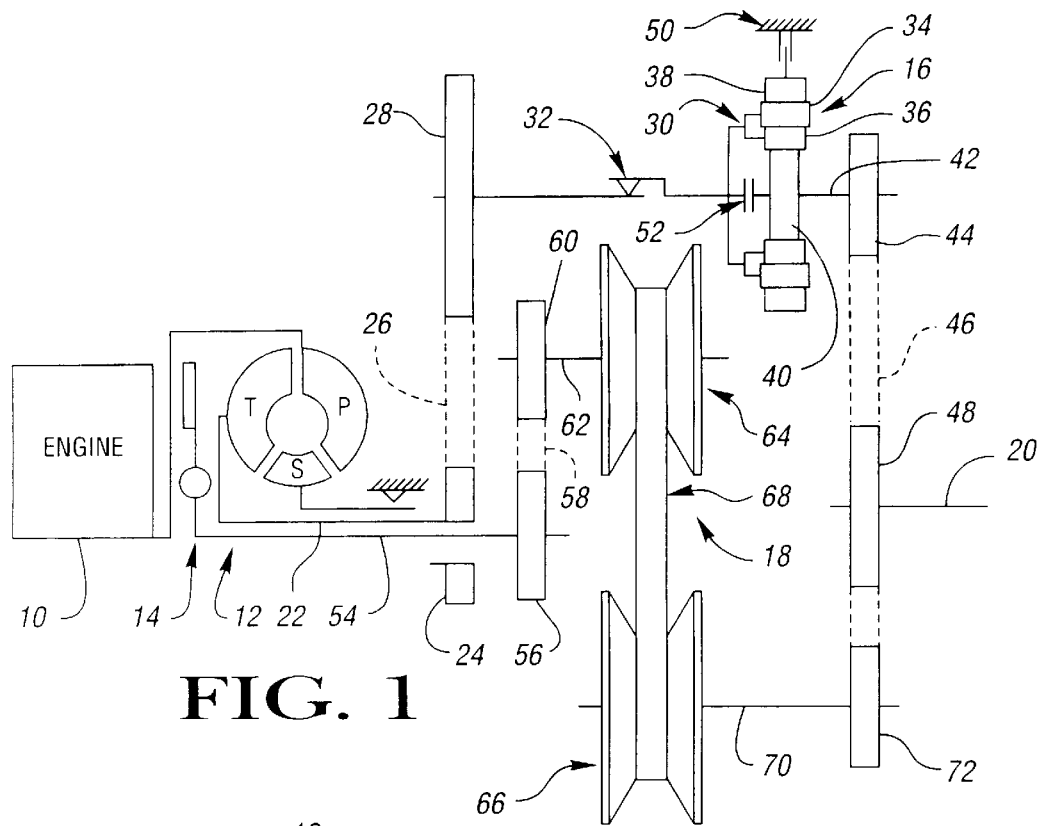
FIG. 1 is a diagrammatic view of one embodiment of the invention.

FIG. 1 describes a powertrain having an engine 10, a torque converter 12, a direct clutch 14, a planetary gear arrangement 16, a continuously variable unit (CVU) 18 and an output member or shaft 20. The engine 10 drives a pump or impeller "P" of the torque converter 12 which in turn provides fluid drive to a turbine "T". The turbine "T" has an output shaft 22 which is connected to a sprocket gear 24 which in turn is connected through a chain 26 to another sprocket or gear 28.

The sprocket 28 is connected to a planet carrier assembly 30 of the planetary gearing 16 through a conventional one-way clutch 32. The planet carrier assembly 30 has meshing pinion gears 34 and 36 which are disposed in mesh with a ring gear 38 and a sun gear 40, respectively. The sun gear 40 is connected with a shaft 42 which in turn is drivingly connected with a sprocket or gear 44. The sprocket 44 is drivingly connected through a chain 46 with an output sprocket or gear 48 which is connected with the output shaft 20. The ring gear 38 is adapted to be selectively stationary by a conventional fluid operated brake 50 and the carrier assembly 30 and sun gear 40 can be connected to operate as a single unit through the selective engagement of a conventional fluid operated clutch 52.

As is well known in planetary gearing, when two members of the planetary gearset are connected to rotate in unison, the entire group will rotate as a unit. Thus, with the energization of clutch 52, the shaft 42 and therefore sprocket 44 will rotate at the same speed as the sprocket 28. The planetary unit 16 will be in a 1:1 drive relationship. With the compound planetary gearset, actuation of the selectively engageable brake 50 will cause the planetary gear arrangement to have a reverse ratio such that the shaft 42 will rotate in the direction opposite to the sprocket 28.

The direct clutch 14 is drivingly connected through an input shaft 54 with a gear or sprocket 56, which in turn is connected through a chain 58 to a gear or sprocket 60. A shaft 62 connects the sprocket 60 with a conventional variable diameter sheave assembly 64 which is a portion of the CVU 18. Another sheave assembly 66 is also a portion of the CVU 18. The sheave assemblies 64 and 66 are connected by a conventional steel belt assembly 68. The operation of the sheave assemblies 64 and 66 to produce a variable ratio between the shaft 62 and an output 70 are well known. The output shaft 70 is drivingly connected with a sprocket 72 and thereafter through the chain 46 with the output sprocket 48. The chain 46 engages all three sprockets 44, 48 and 72.

During operation of the transmission shown in FIG. 1, the power supplied by the engine is directed to the torque converter 12 when the direct clutch 14 is disengaged. This power is transmitted through the turbine "T" to the sprockets 24 and 28 from which it is delivered through the one-way clutch 32 to the planetary gearing 16. During forward operation, the clutch 52 is engaged, such that the sprocket 44 turns at the same speed and direction as the sprocket 28, thereby driving the output shaft 20 forwardly.

When power is supplied to the torque converter 12, a slip phenomena occurs such that the impeller "P" of the torque converter 12 rotates faster than the turbine "T". Such phenomena is well known and is often termed the speed ratio or slip ratio. This fluid device will provide a high torque multiplier at very high slip ratios, such that a torque multiplication from the engine to the sprocket 24 will occur. Conventionally, the torque multiplication level at stall is designed to be between 1.7 and 2.5. When the torque converter is at stall, the turbine "T" is stationary while the impeller "P" is rotating.

The sprocket 24 cooperates with the sprocket 28 and chain 26 to provide a speed ratio of approximately 1.85 from the input shaft 22 to the output of sprocket 28. Thus, the output of sprocket 28 has a torque multiplier of 1.85 times the torque ratio of the torque converter 12. The high torque thus achieved is conducted through the planetary gear arrangement 16 to the sprocket 44, chain 46 and sprocket 48 to the output 20.

When the torque converter 12 approaches a fluid coupling for essentially zero slip condition, the direct clutch 14 can be engaged. At this point, the output torque from the torque converter is essentially equal to the output torque of the engine such that the direct clutch when engaged will transmit only engine torque to the shaft 54. The shaft 54 drives the sprocket 56 which in turn drives the sprocket 60 in a 1:1 relationship. The sprocket 60 drives the CVU 18.

At initial vehicle launch, the ratio between the sheave assemblies 64 and 66 is at approximately 2.39 underdrive, which means the sheave assembly 66 rotates at a slower speed than the sheave assembly 64. The sprockets 72 and 48 have a speed ratio of 1.49 therebetween, while the sprockets 44 and 48 have a speed ratio of 1.85.

The overall drive ratio between the shaft 22 and the shaft 20 is 3.42. The overall drive ratio from the shaft 54 to the shaft 20 is 3.55. The ratio between these drives is 1.04. The torque converter 12 has a slip ratio of about 0.04 which accounts for the speed ratio of the mechanical drive path, that is, the planetary gearing, being less than the drive path through the CVU 18.

With the slip ratio of 0.04, the output member 20 is essentially driven at the same speed by either the mechanical path or the variable path. However, when the ratio of the CVU 18 is reduced from the underdrive toward an overdrive ratio, the shaft 20 will speed up thereby driving the shaft 42 at an increased speed. When this occurs, the one-way clutch 32 will permit the overrunning of the planetary gear arrangement 16 relative to the sprocket 28, such that further speed increases will be incurred by the CVU 18 only.

It should be apparent that at vehicle launch, the high torque multiplication required to launch the vehicle is taken through the mechanical path of the planetary gear arrangement 16. It is only after this initial acceleration has occurred, that the CVU 18 is permitted to come on line and transmit the power from the engine 10 to the output 20. Thus, the CVU 18 operates under the low torque conditions normally associated with the engine 10 thereby maintaining the stresses in the belt 68 and sheave assemblies 64 and 66 at an acceptable level.

Figure 2:
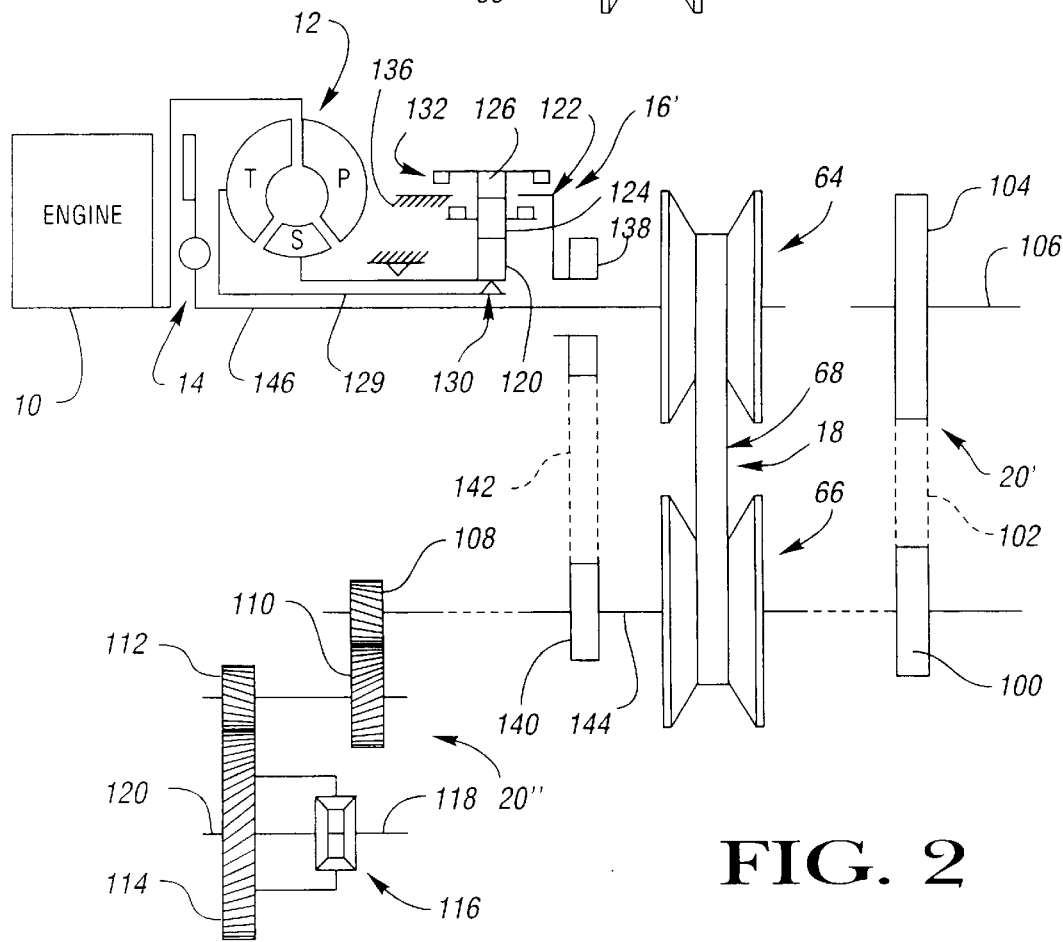
FIG. 2 is a diagrammatic view of a second embodiment of the invention.

The powertrain shown in FIG. 2 has an engine 10, a torque converter 12, a direct clutch 14, a CVU 18, and a planetary gear arrangement 16'. The arrangement shown in FIG. 2 has alternative output systems shown. One output 20' consists of a sprocket 100, a chain 102 and an output sprocket 104 which in turn drives an output shaft 106.

An alternative output 20" has a fmal drive gear assembly consisting of gears 108, 110, 112 and 114. The gear 114 drives a conventional differential gear unit 116 which in turn drives two output shafts 118 and 120. The alternative output arrangement 20" is consistent with front wheel drive vehicles while the alternative output 20 is consistent with rear wheel drive vehicles. Thus, either output 20 or 20'0 may be utilized. A similar front wheel drive output can be utilized with the transmission shown in FIG. 1.

The planetary gear arrangement 16 includes a carrier assembly 122 having a plurality of pinions 124 which mesh with a ring gear 126 and a sun gear 128. The planetary gear unit 16' is what is termed a simple planetary in that only one level of planet pinions is utilized.

The torque converter turbine "T" drives a transmission input shaft 129 which in turn drives the sun gear 128 through a one-way device 130. The ring gear 126 is controlled by a synchronizer assembly, designated 132, and the carrier 122 is controlled by a synchronizer assembly, designated 134. The synchronizer assembly 132 permits the ring gear 126 to be connected to a housing 136 or to an output sprocket 138. The synchronizer assembly 134 permits the carrier 122 to be connected to the housing 136 or to the sprocket 138. The sprocket 138 drives a sprocket 140 through a conventional chain 142. The sprocket 140 drives a transmission output shaft 144, which in turn can drive either output 20" or 20'.

The output shaft 144 is also drivingly connected with the sheave assembly 66 of the CVU 18. The sheave assembly 64 of the CVU 18 is connected through an input shaft 146 with the direct clutch 14.

When the synchronizer assembly 132 connects the ring gear 126 to the housing 136 and the carrier 122 is connected with the sprocket 138, a forward underdrive ratio of approximately 3:1 is created. Thus, the sprocket 138 travels at one third the speed of the turbine "T" thereby multiplying the torque supplied from the turbine "T" to the output shaft 144.

The turbine "T" as previously commented on above, multiplies the engine torque by the torque ratio of the torque converter assembly 12. Thus, a high forward torque drive is provided to the output shaft 144 when the forward ratio is provided.

A reverse drive ratio is provided at the planetary assembly 16' when the synchronizer assembly 132 connects the ring gear 126 with the sprocket 138 and the synchronizer assembly 134 connects the carrier 122 with the housing 136. In this situation, the sun gear 128 drives the ring gear 126 in reverse relative to the engine 10 at a multiplying factor of approximately 2:1, and along with the torque ratio of the torque converter 12 supplies a high reverse torque drive to the output shaft 144.

The sprockets 138 and 140 are sized such that when the torque converter 12 reaches a speed ratio of approximately 0.04, the speed of the sheave assembly 66 and sprocket 140 will be equal such that the clutch 14 can be engaged thereby transmitting torque to the sheave assembly 164 in bypassing relationship with the planetary gearset 16'.

As the transmission ratio of the CVU 18 is changed from an underdrive to an overdrive, the output 144 will accelerate or speed up such that the one-way clutch 130 will permit the planetary gear assembly 16' to be rotated free of the turbine "T".

As with FIG. 1, the powertrain shown in FIG. 2 will provide high output torques to the vehicle drive during the forward and reverse operation when the planetary gearset 16' is disposed within the power path, and at higher output speeds and lower torques, the continuously variable unit 18 will be disposed within the power path to effect the ratio changes between the input from the engine 10 to the output 144. Thus, the system accommodates the higher torque requirements which is necessary to launch vehicles of higher inertia and also improve the gradeability of the vehicle.

I claim:

1. A powertrain comprising:

an engine having an output member;

a torque converter having an input member connected with said engine and an output member;

a first input shaft drivingly connected with said torque converter output member;

a second input shaft;

a selectively engageable input clutch for selectively connecting said engine with said second input shaft;

a planetary gearset having a sun gear; a ring gear and a planet carrier assembly, said planet carrier assembly being drivingly connectable with said first input shaft;

a selectively engageable forward clutch connecting said sun gear and said carrier assembly for conjoint rotation;

a reverse brake selectively restraining rotation of said ring gear;

a first output member drivingly connected with said sun gear;

a variable ratio flexible drive mechanism having an input sheave member drivingly connected with said second input shaft, an output sheave member drivingly connected with a second output shaft and a flexible drive transmitting interconnecting said sheave members; and a disconnect clutch for disconnecting said carrier assembly from said first input shaft when said input clutch is connected to provide an input torque to said input sheave.

2. A powertrain comprising:

an engine having an output member;

a torque converter having an input member connected with said engine and an output member;

a first input shaft drivingly connected with said torque converter output member;

a second input shaft;

a selectively engageable input clutch for selectively connecting said engine with said second input shaft;

a planetary gearset having an input member, a reaction member and an output member, said input member being drivingly connectable with said first input shaft;

a selectively engageable forward clutch directly connecting said input member and said output member for conjoint rotation;

a reverse brake selectively restraining rotation of said reaction member;

a first output member drivingly connected with said output member of said planetary gearset;

a variable ratio flexible drive mechanism having an input sheave member drivingly connected with said second input shaft, an output sheave member drivingly connected with a second output shaft and a flexible drive transmitting interconnecting said sheave members; and a one-way clutch for disconnecting said input member of said planetary gearset from said first input shaft when said input clutch is connected to provide an input torque to said input sheave.

* * * * *